United States Patent
Shimizu et al.

(10) Patent No.: US 11,637,767 B2
(45) Date of Patent: Apr. 25, 2023

(54) INFORMATION PROCESSING APPARATUS AND PACKET CONTROL METHOD

(71) Applicant: FUJITSU LIMITED, Kawasaki (JP)

(72) Inventors: Takashi Shimizu, Kawasaki (JP); Tomohiro Ishihara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 3 days.

(21) Appl. No.: 17/347,655

(22) Filed: Jun. 15, 2021

(65) Prior Publication Data

US 2022/0060405 A1 Feb. 24, 2022

(30) Foreign Application Priority Data

Aug. 20, 2020 (JP) .............................. JP2020-139120

(51) Int. Cl.
*H04L 45/021* (2022.01)
*H04L 45/00* (2022.01)
*H04L 45/7453* (2022.01)

(52) U.S. Cl.
CPC ............ *H04L 45/021* (2013.01); *H04L 45/22* (2013.01); *H04L 45/7453* (2013.01)

(58) Field of Classification Search
CPC .... H04L 45/021; H04L 45/22; H04L 45/7453
See application file for complete search history.

(56) References Cited

U.S. PATENT DOCUMENTS

| 9,245,626 B2 | 1/2016 | Fingerhut et al. |
| 2005/0141519 A1 | 6/2005 | Rajgopal et al. |
| 2015/0143371 A1* | 5/2015 | Ackley ............... G06F 9/45558 718/1 |
| 2016/0014023 A1 | 1/2016 | He et al. |
| 2016/0134536 A1* | 5/2016 | Wang .................. H04L 45/7453 370/392 |

(Continued)

FOREIGN PATENT DOCUMENTS

| CN | 108924047 A | 11/2018 |
| JP | 2002-208945 A | 7/2002 |

OTHER PUBLICATIONS

Extended European Search Report dated Oct. 25, 2021 for corresponding European Patent Application No. 21171486.0, 13 pages.

(Continued)

*Primary Examiner* — Donald L Mills
(74) *Attorney, Agent, or Firm* — Fujitsu Patent Center

(57) ABSTRACT

An information processing apparatus includes a first memory, a second memory, and a control circuit. The first memory stores a first table where entries, which indicate forwarding methods for packets, are stored at positions corresponding to hash values calculated from header information of the packets. The second memory stores a second table that is larger than the first table. The control circuit detects, when the first table is updated, a conflict state where there is conflict between storage positions of different entries in the first table. The control circuit moves entries stored in the first table to the second table in response to the detecting of the conflict state. The control circuit detects resolution of the conflict state when the second table is updated. In response to the detecting of the resolution, the control circuit moves the entries stored in the second table to the first table.

8 Claims, 16 Drawing Sheets

(56) References Cited

U.S. PATENT DOCUMENTS

2018/0152413 A1* 5/2018 Ackley ............... H04L 61/2596
2020/0136971 A1* 4/2020 Cohen ................... H04L 9/0833

OTHER PUBLICATIONS

Hung, Chi-Hsiang et al., "Heterogeneous Flow Table Integration for Capacity Enhancement in Software-Defined Networks", 2018 International Conference on Computing, Networking and Communications (ICNC), IEEE, Mar. 5, 2018, pp. 832-836, XP033361159, DOI: 10.1109/ICCNC.2018.8390421 [retrieved on Jun. 19, 2018].

* cited by examiner

FLOW TABLE

| ADDRESS | HEADER FIELD | ACTION | ACTION DATA |
|---|---|---|---|
| 3FF | UDP, 192.168.24.10, ⋯ | FORWARD | |
| ... | ... | ... | ... |
| 210 | TCP, 192.168.24.10, ⋯ | FORWARD, NAT | srcIP=10.25.227.22, srcPort=22 |
| ... | ... | ... | ... |
| 002 | TCP, 192.168.24.11, ⋯ | FORWARD, NAT | srcIP=10.25.227.23, srcPort=22 |
| 001 | UDP, 192.168.25.10, ⋯ | DROP | |
| 000 | TCP, 192.168.24.12, ⋯ | FORWARD | |

CONFLICT LIST                                  153

| ID | COMMUNI-CATION PROTOCOL | SOURCE IP ADDRESS | SOURCE PORT NUMBER | DESTINATION IP ADDRESS | DESTINATION PORT NUMBER | HASH VALUE |
|---|---|---|---|---|---|---|
| 0 | TCP | 10.25.227.22 | 5601 | 10.43.127.10 | 22 | 76543210 |
|   | UDP | 10.25.234.86 | 43 | 10.1.103.5 | 56 | abcd3210 |
| 1 | TCP | 11.54.3.6 | 334 | 10.4.12.110 | 22 | efghabcd |
|   | UDP | 10.20.30.4 | 33 | 103.66.28.34 | 23 | 1234abcd |
| ... | ... | ... | ... | ... | ... | ... |

FIG. 10

INFORMATION PROCESSING APPARATUS AND PACKET CONTROL METHOD

CROSS-REFERENCE TO RELATED APPLICATION

This application is based upon and claims the benefit of priority of the prior Japanese Patent Application No. 2020-139120, filed on Aug. 20, 2020, the entire contents of which are incorporated herein by reference.

FIELD

The embodiments discussed herein relate to an information processing apparatus and a packet control method.

BACKGROUND

A proposed technology called Software Defined Networking (hereinafter, "SDN") produces a virtual network through software control. An SDN system has two types of module, called the "control plane" and the "data plane". The control plane decides a route on which a packet is to be forwarded between switches and registers an entry in a flow table of each switch indicating how the packet is to be processed. The data plane compares a packet that has arrived at a switch with the flow table to determine how to process the packet.

Each entry in the flow table corresponds to one flow. A flow is defined by the header information of packets, such as a transmission source IP (Internet Protocol) address, a source port number, a destination IP address, and a destination port number. Each entry is stored at a position in a flow table that is determined based on a hash value calculated from the header information. The data plane searches the flow table using a hash value of a packet that has arrived.

A router configured to store a routing table across both a high-speed CAM (Content-Addressable Memory) and a low-speed RAM (Random Access Memory) has been proposed.

See, for example, Japanese Laid-open Patent Publication No. 2002-208945.

Packet transfers on the data plane may be implemented using the limited hardware resources of an information processing apparatus. As one example, packet transfers on the data plane may be implemented using a hardware accelerator, such as an FPGA (Field Programmable Gate Array) that has been added to a server computer.

With the configuration described above, the memory where the flow table is stored may be a bottleneck for throughput. Memories provided with a high-speed interface for circuits that process packets often have a small storage capacity. When this type of memory is used to store a flow table, the size of the flow table is reduced, resulting in an increased frequency of conflict over the storage positions of entries that are determined by hash values. On the other hand, memories provided with a large storage capacity usually do not have a high-speed interface for circuits that process packets. When this type of memory is used to store a flow table, there is a fall in access speed for the flow table.

SUMMARY

According to one aspect, there is provided an information processing apparatus including: a first memory storing a first table in which entries, which indicate forwarding methods for packets, are stored at positions corresponding to hash values calculated from header information of the packets; a second memory storing a second table that is larger than the first table; and a control circuit which executes a process including: detecting, upon updating the first table, a conflict state where there is conflict between storage positions of different entries in the first table; moving the entries stored in the first table to the second table in response to the detecting of the conflict state; detecting resolution of the conflict state upon updating the second table; and moving the entries stored in the second table to the first table in response to the detecting of the resolution.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 depicts one example of a flow table;
FIG. 10 depicts one example of a conflict list.

DESCRIPTION OF EMBODIMENTS

Several embodiments will be described below with reference to the accompanying drawings.

First Embodiment

Figure 1:
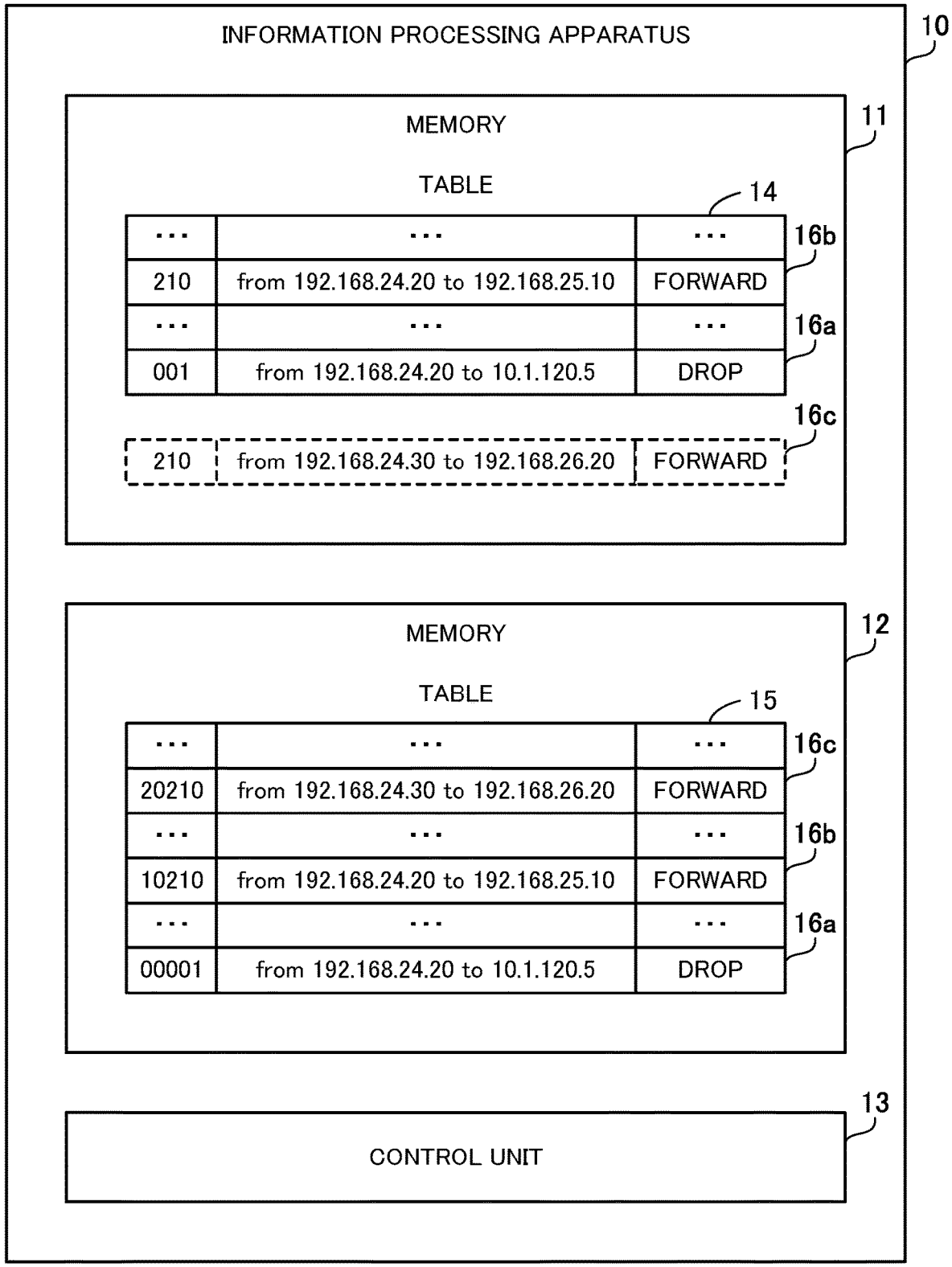
FIG. 1 depicts an information processing apparatus according to a first embodiment.

A first embodiment will now be described.
FIG. 1 depicts an information processing apparatus according to the first embodiment.

An information processing apparatus 10 according to the first embodiment transfers packets by referring to a table. The information processing apparatus 10 may implement the functions of the data plane in SDN, or may implement a so-called "virtual router". The information processing apparatus 10 may be a server computer and/or may execute a virtual machine. As one example, the information processing apparatus 10 uses a virtual router to transfer packets that are sent and received by a virtual machine.

The information processing apparatus 10 includes memories 11 and 12 and a control unit 13. As one example, the memories 11 and 12 are volatile semiconductor memories such as RAM (Random Access Memory). The memory 11 and the control unit 13 may be included in a hardware accelerator, such as an FPGA, and the memory 12 may be provided outside the hardware accelerator. As examples, the memory 11 is an SRAM (Static Random Access Memory) included in the FPGA, the memory 12 is a DRAM (Dynamic Random Access Memory), which is an onboard memory connected to the FPGA, and the control unit 13 is a logic circuit included in the FPGA. However, the control unit 13 may instead be a CPU (Central Processing Unit), and the memory 12 may be a DRAM, which is a system memory used by the CPU.

The memory 11 is accessed from circuits that process packets (for example, a logic circuit in the FPGA) via a high-speed interface. On the other hand, the memory 12 is accessed from circuits that process packets via a slower interface than the memory 11. When expressed in relative terms, the memory 11 is a high-speed, small-capacity memory and the memory 12 is a low-speed, large-capacity memory.

The memory 11 stores a table 14. This table 14 may be referred to as a "flow table". The table 14 stores a plurality of entries, where each entry corresponds to one flow and indicates a processing method for the packets belonging to that flow. Each flow is identified by header information, such as a communication protocol, a source IP address, a source port number, a destination IP address, and a destination port number. The information indicating the processing method may include information on whether a packet is to be forwarded or discarded (or "dropped"), and may include NAT (Network Address Translation) information for converting an IP address and/or port number. The information indicating the processing method may also include information on the communication interface that is to output the packet.

In the table 14, the entry for a given flow is stored at a position corresponding to a hash value calculated from the header information. As one example, the hash value is a 32-bit string calculated as a CRC (Cyclic Redundancy Checksum) 32 value. As one example, in the table 14, a string composed of a predetermined number of least significant bits of the hash value, such as a string composed of the lower 10 bits, is used as the index of an entry. As one example, an entry 16a indicates that packets from the address 192.168.24.20 to the address 10.1.120.5 are to be dropped. In the table 14, the entry 16a is stored at the position 0x001. An entry 16b indicates that packets from the address 192.168.24.20 to the address 192.168.25.10 are to be forwarded. In the table 14, the entry 16b is stored at the position 0x210.

The memory 12 stores a table 15. This table 15 too may be referred to as a "flow table". Like the table 14, the table 15 stores a plurality of entries. The table 15 is larger in size than the table 14 and is capable of storing more entries than the table 14. As one example, in the table 15, a string composed of a predetermined number of least significant bits of the hash value, such as a string composed of the lower 20 bits, is used as the index of an entry. The bit length of the indices is larger in the table 15 than in the table 14.

When the number of flows is low, all entries are stored in the table 14, and the table 15 remains empty. The processing method of packets arriving at the information processing apparatus 10 is decided by referring to the table 14. Entries for new flows are added to the table 14. The control unit 13 monitors the updating of the table 14. When the number of entries has increased, the control unit 13 detects a conflict state where there is conflict between the storage positions of different entries in the table 14. As one example, consider a case where an entry 16c is to be added to the table 14. The entry 16c indicates that packets from the address 192.168.24.30 to the address 192.168.26.20 are to be forwarded. According to the hash value calculated from the header information, the entry 16c is to be stored at the 0x210 position in the table 14. However, this would produce conflict in the table 14 between the storage positions of the entries 16b and 16c.

When a conflict state is detected, the control unit 13 moves entries stored in the table 14 to the table 15. As one example, the control unit 13 copies all of the entries stored in the table 14 into the table 15. Due to the tables having different sizes, the index of each entry changes when the entries are moved. Once the table 15 has become valid, the method of processing a packet that arrives at the information processing apparatus 10 is determined by referring to the table 15 instead of the table 14. Since the table 15 is larger in size than the table 14, the storage positions of the entries that conflict with each other in the table 14 are dispersed. As examples, in the table 15, the entry 16a is stored at the position 0x00001, the entry 16b is stored at the position 0x10210, and the entry 16c is stored at the position 0x20210.

Once the table 15 has become valid, table management such as the addition and deletion of entries is performed at the table 15 instead of the table 14. The control unit 13 monitors updating of the table 15 and detects the resolution of the conflict state. As one example, the control unit 13 stores a conflict list in which entries with conflicting storage positions in the table 14 are listed. The control unit 13 may also use the conflict list to detect that a conflict state has been resolved through updating of the table 15 (as one example, due to an entry being deleted from the table 15).

On detecting the resolution of a conflict state, the control unit 13 moves entries stored in the table 15 to the table 14. As one example, the control unit 13 copies all of the entries stored in the table 15 into the table 14. Due to the tables having different sizes, the index of each entry changes when the entries are moved. Once the table 14 has become valid, the method of processing a packet that arrives at the information processing apparatus 10 is determined by referring to the table 14 once again.

According to the information processing apparatus 10 of the first embodiment, flexible network control is achieved by software through the dynamic addition and deletion of entries indicating flows. In addition, a virtual router may be realized by limited hardware resources, such as an FPGA. While the number of flows is small and there is no conflict between the storage positions of entries, packet control is performed by referring to the table 14 stored in the high-speed memory 11. On the other hand, when there are many flows and conflict has occurred for the storage positions of entries in the table 14, packet control is performed by referring to the table 15 stored in the large-capacity memory 12. Accordingly, the balance between packet processing speed and the number of flows that registered is improved, which leads to an increase in throughput.

Second Embodiment

A second embodiment will be described next.

Figure 2:
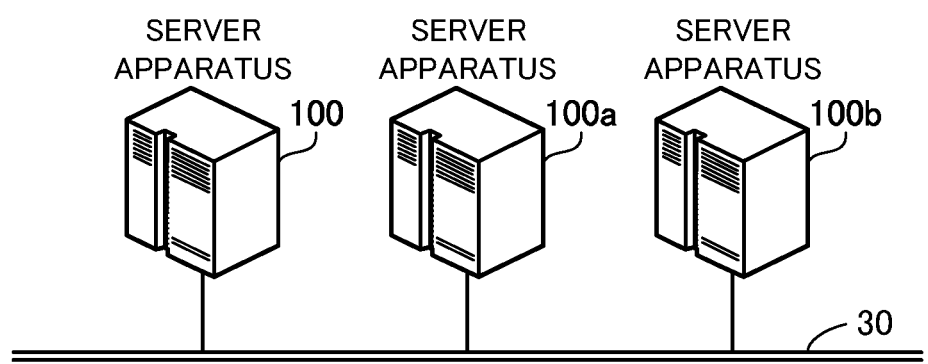
FIG. 2 depicts one example of an information processing system according to a second embodiment.

FIG. 2 depicts one example of an information processing system according to the second embodiment.

In the information processing system according to the second embodiment, a virtual machine is used to virtualize a computer, and a virtual router is used to virtualize a network. The information processing system may be a system at a data center or a so-called "cloud system". The information processing system includes a plurality of server apparatuses, such as server apparatuses 100, 100a, and 100b. The server apparatuses 100, 100a, and 100b are connected to a network 30. One or more virtual machines run on each of the server apparatuses 100, 100a, and 100b, and a virtual router is provided for each server apparatus. The virtual routers of the plurality of server apparatuses operate in concert to form a virtual network for use by the virtual machines running on the server apparatuses.

Figure 3:
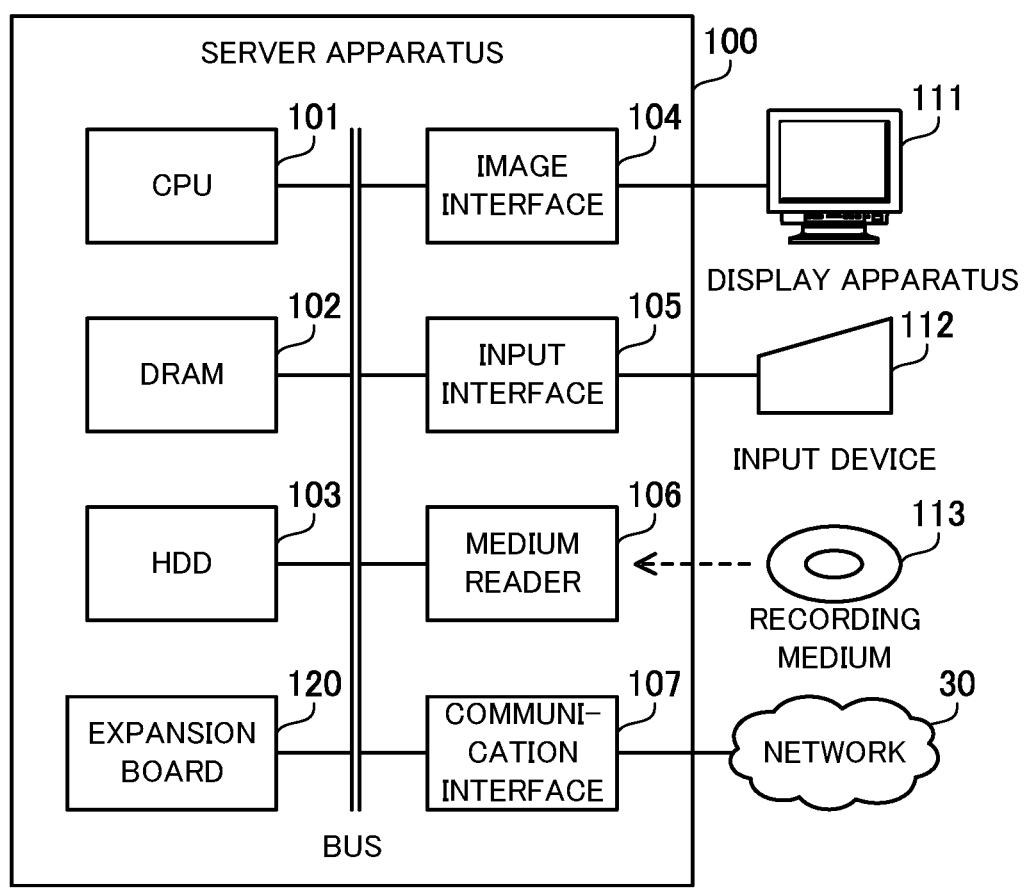
FIG. 3 is a block diagram depicting example hardware of a server apparatus.

FIG. 3 is a block diagram depicting example hardware of a server apparatus.

The server apparatus 100 includes a CPU 101, a DRAM 102, a hard disk drive (HDD) 103, an image interface 104, an input interface 105, a medium reader 106, a communication interface 107, and an expansion board 120. These units included in the server apparatus 100 are connected to a bus. The server apparatus 100 corresponds to the information processing apparatus 10 in the first embodiment. The other server apparatuses may have the same hardware as this server apparatus 100.

The CPU 101 is a processor that executes the instructions of a program. The CPU 101 loads at least a part of a program and data stored in the HDD 103 into the DRAM 102 and executes the program. The CPU 101 may be equipped with a plurality of processor cores and the server apparatus 100 may include a plurality of processors. A group composed of plurality of processors may be collectively referred to as a "multiprocessor" or simply as a "processor". The CPU 101 may transfer data to the expansion board 120 to have processing executed by the expansion board 120.

The DRAM 102 is a volatile semiconductor memory that temporarily stores a program to be executed by the CPU 101 and data used in computation by the CPU 101. The DRAM 102 may also be regarded as the "system memory" of the server apparatus 100. The server apparatus 100 may include other types of memory aside from RAM, and may include a plurality of types of memory.

The HDD 103 is non-volatile storage that stores software programs, such as an OS (Operating System), middleware, and application software, as well as data. Aside from a hard disk drive, the server apparatus 100 may include other types of storage, such as a flash memory or an SSD (Solid State Drive), and may include a plurality of types of storage.

In accordance with instructions from the CPU 101, the image interface 104 outputs images to a display apparatus 111 connected to the server apparatus 100. Any type of display apparatus, such as a CRT (Cathode Ray Tube) display, a liquid crystal display (LCD), an organic EL (OEL: Organic Electro-Luminescence) display, or a projector, may be used as the display apparatus 111. A different output apparatus other than the display apparatus 111, such as a printer, may also be connected to the server apparatus 100.

The input interface 105 receives an input signal from an input device 112 connected to the server apparatus 100. Any type of input device, such as a mouse, a touch panel, a touch pad, and a keyboard, may be used as the input device 112. A plurality of types of input device may be connected to the server apparatus 100.

The medium reader 106 is a reader apparatus that reads programs and/or data recorded on a recording medium 113. Any type of recording medium, such as a magnetic disk like a flexible disk (FD) or an HDD, an optical disc such as a CD (Compact Disc) or DVD (Digital Versatile Disc), or a semiconductor memory may be used as the recording medium 113. As one example, the medium reader 106 copies a program and/or data read from the recording medium 113 to another recording medium, such as the DRAM 102 or the HDD 103. As one example, the program that has been read out is executed by the CPU 101. Note that the recording medium 113 may be a portable recording medium and may be used to distribute programs and/or data. The recording medium 113 and/or the HDD 103 may be regarded as "computer-readable recording media".

The communication interface 107 is connected to the network 30 and communicates with other server apparatuses via the network 30. The communication interface 107 may be a wired communication interface connected to a wired communication apparatus, such as a switch or a router, or may be a wireless communication interface connected to a wireless communication apparatus, such as a base station or an access point.

The expansion board 120 is a hardware accelerator that includes an FPGA. In accordance with instructions from the CPU 101, the expansion board 120 executes part of the processing of the CPU 101 in place of the CPU 101. The expansion board 120 is used to speed up specific types of routine processing. As will be described later, in the second embodiment, the expansion board 120 executes some of the processing of a virtual router. As one example, the expansion board 120 acquires circuit data from the DRAM 102 and sets a logic circuit in the FPGA. The expansion board 120 processes input data using the set logic circuit and outputs a processing result to the DRAM 102.

Figure 4:
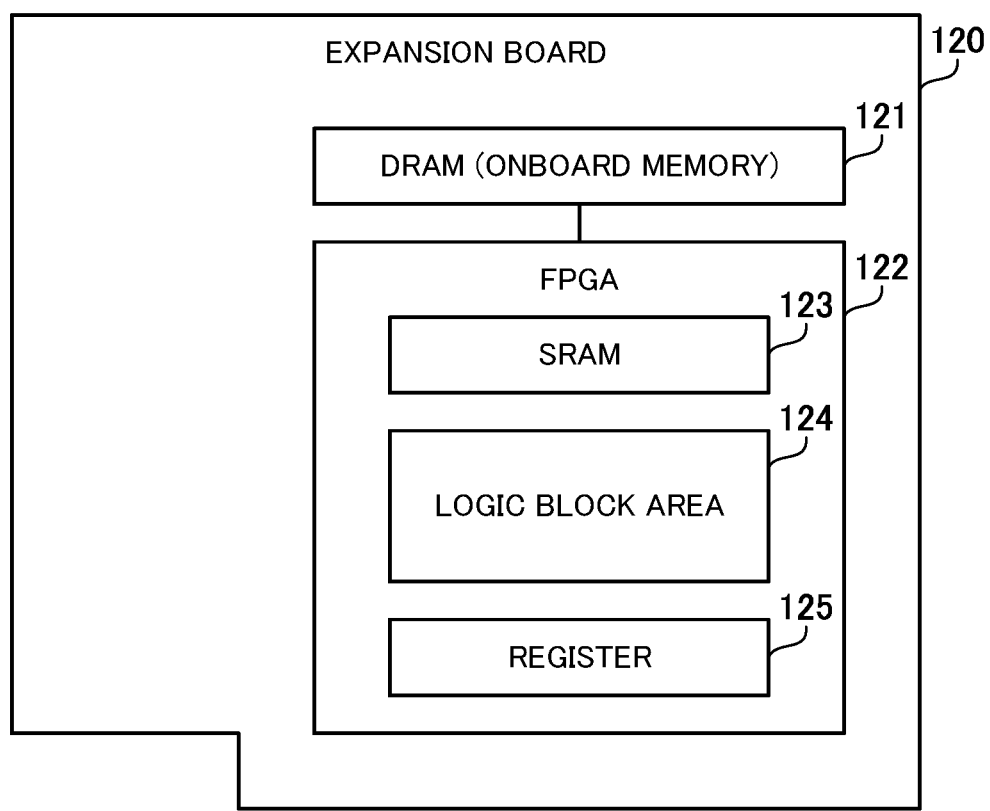
FIG. 4 is a block diagram depicting example hardware of an expansion board.

FIG. 4 is a block diagram depicting example hardware of the expansion board.

The expansion board 120 has a DRAM 121 and an FPGA 122. The DRAM 121 and the FPGA 122 are connected by a memory bus. The DRAM 121 is an onboard memory that is included on the expansion board 120 but is provided outside the FPGA 122. The DRAM 121 stores data used by the FPGA 122.

The FPGA 122 is a programmable device in which logic circuits are reconfigurable after manufacturing based on circuit data. The FPGA 122 includes an SRAM 123, a logic block area 124, and a register 125. The SRAM 123 is a volatile semiconductor memory that is accessible from the logic block area 124 and stores data used in the logic block area 124.

The logic block area 124 includes a large number of logic blocks whose input/output relationships are reconfigurable. As one example, each logic block includes a look-up table that determines the output signal from the input signal. By changing the input/output relationships of the respective logic blocks according to the circuit data, a desired logic circuit is implemented in the logic block area 124. The register 125 is a volatile semiconductor memory that temporarily stores a small amount of data. The register 125 temporarily stores data to be used in the logic block area 124.

The memories that is accessible from the logic block area 124 are made up of the DRAM 102 that is the system memory, the DRAM 121 that is the onboard memory, the SRAM 123, and the register 125. The register 125 has the smallest storage capacity. The SRAM 123 has a larger storage capacity than the register 125. The DRAM 121 has a larger storage capacity than the SRAM 123. The DRAM 102 has a storage capacity which is larger again than the DRAM 121.

The DRAM 102 has the slowest access speed from the logic block area 124. The DRAM 121 is faster to access from the logic block area 124 than the DRAM 102. The SRAM 123 is faster to access from the logic block area 124 than the DRAM 121. The register 125 is faster again to access from the logic block area 124 than the SRAM 123. Accordingly, the DRAM 102, the DRAM 121, the SRAM 123, and the register 125 have decreasing storage capacity in that order. Conversely, the access speed from the logic block area 124 falls in order of the register 125, the SRAM 123, the DRAM 121, and the DRAM 102.

Figure 5:
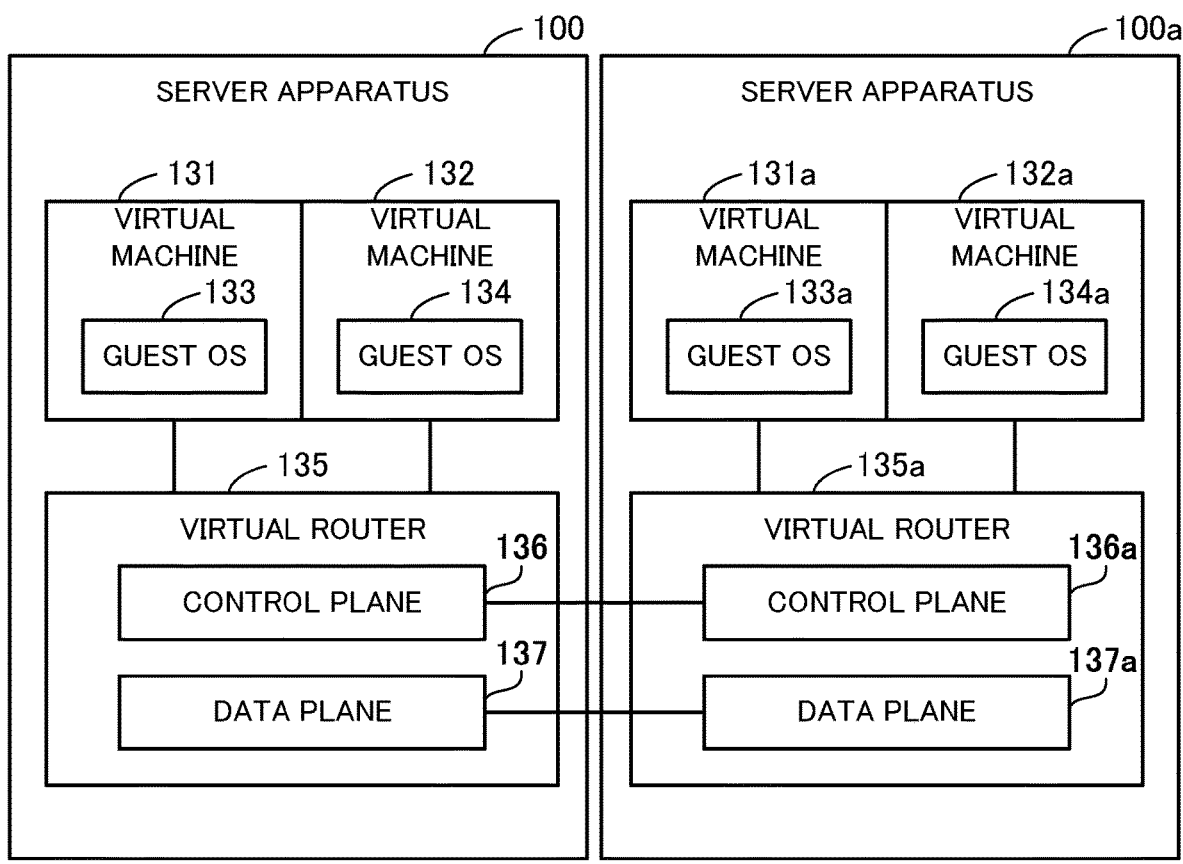
FIG. 5 is a block diagram depicting example software of a server apparatus.

FIG. 5 is a block diagram depicting example software of a server apparatus.

As described above, a virtual machine is used to virtualize a computer, and virtual routers are used to virtualize a network. Although FIG. 5 depicts the server apparatuses 100 and 100a as examples, other server apparatuses similarly include a virtual machine and a virtual router.

The server apparatus 100 includes a plurality of virtual machines such as virtual machines 131 and 132, and a virtual router 135. The server apparatus 100 may include a hypervisor or management OS for controlling the virtual machines 131 and 132. The virtual machine 131 has a guest OS 133. The virtual machine 132 has a guest OS 134. Hardware resources, such as CPU resources and RAM resources, of the server apparatus 100 are assigned to the virtual machines 131 and 132. The guest OS 133 manages the hardware resources assigned to the virtual machine 131 and controls the execution of application software on the virtual machine 131. The guest OS 134 manages the hardware resources assigned to the virtual machine 132 and controls the execution of application software on the virtual machine 132.

The virtual router 135 functions as a router that processes packets. The virtual router 135 has a control plane 136 and a data plane 137. The virtual router 135 receives packets outputted by the virtual machines 131 and 132 and processes the packets, for example, by forwarding the packets to another server apparatus, based on the headers of the received packets. The virtual router 135 also receives packets from another server apparatus and processes the packets, for example, by distributing the packets to the virtual machines 131 and 132, based on the headers of the received packets. The functions of the virtual router 135 will be described in detail later in this specification.

In the same way as the server apparatus 100, the server apparatus 100a includes a plurality of virtual machines, such as the virtual machines 131a and 132a, and a virtual router 135a. The virtual machine 131a has a guest OS 133a. The virtual machine 132a has a guest OS 134a. The virtual router 135a has a control plane 136a and a data plane 137a.

The functions of the virtual router included in each server apparatus will now be described. Each virtual router has a control plane and a data plane. The control plane determines the forwarding route of packets for each flow and sets flow information for packet forwarding on the data plane of each virtual router. A flow is defined for each combination of a transmitter and a receiver of packets, and is specified from header information including the communication protocol, the source IP address, the source port number, the destination IP address, and the destination port number.

This second embodiment uses distributed flow control where the control planes of a plurality of virtual routers are linked to determine a flow. Accordingly, the control plane 136 of the virtual router 135 and the control plane 136a of the virtual router 135a communicate with each other to determine a flow. The data plane receives a packet and determines the processing method of the received packet according to the flow information set by the control plane.

As one example, the data plane 137 extracts header information from a received packet and searches for flow information corresponding to the extracted header information. When corresponding flow information exists, the data plane 137 determines the packet forwarding destination according to the corresponding flow information. On the other hand, when corresponding flow information does not exist, the data plane 137 transfers the received packet to the control plane 136 as a packet of an unknown flow.

The control plane 136 searches for the shortest route from the transmission source of a packet (as one example, a virtual machine that is the source) to the transmission destination (as one example, a virtual machine that is the destination) based on the header information of a packet obtained from the data plane 137 and thereby determines the forwarding route for the packet. The control plane 136 generates flow information indicating the method of processing packets with the header information in question at the virtual router 135, and provides the flow information to the data plane 137. At this time, the control plane 136 may specify a timeout period for the flow information.

As described above, when an unknown flow has been detected, such as when a new virtual machine has started up, new flow information may be added to the data plane 137. Also, flow information may be deleted from the data plane 137 when a timeout has occurred for the flow information. A timeout for flow information may be a hard timeout that occurs when a specified period has elapsed following registration of the flow information, or may be an idle timeout that occurs when a period since the flow information was last referenced has reached a specified time. Flow information may also be deleted from the data plane 137 when the control plane 136 has detected the shutting down of a virtual machine. The control plane 136 may receive a command indicating the stopping of a virtual machine from a hypervisor or the like.

The control plane 136 is implemented as software executed using the CPU 101 and the DRAM 102. On the other hand, it is preferable for the data plane 137 to receive a large number of packets and determine the forwarding destination of each received packet in a short time. This means that when the entire data plane 137 is implemented by the same software, there is the risk of the load on the CPU 101 becoming excessive. For this reason, the server apparatus 100 implements at least some of the functions of the data plane 137 using the FPGA 122. That is, the server apparatus 100 offloads the load of packet forwarding to the FPGA 122.

Next, searching of the flow information will be described.

FIG. 6 depicts one example of a flow table.

The flow table 161 is held by the data plane 137 of the server apparatus 100. The data planes of other server apparatuses also have similar flow tables. Flow information of a plurality of flows is registered in the flow table 161.

The flow table 161 includes a plurality of entries in which an address, a header field, an action, and action data are associated with each other. These entries may also be referred to as "records" or "flow information". In principle, one entry corresponds to one flow. The address is an identification number that identifies the storage position of an entry in the flow table 161. The bit length of the address is decided in accordance with the size of the flow table 161, that is, the maximum number of entries in the flow table 161. In the example in FIG. 6, the bit length of the address is 10 bits. Accordingly, the flow table 161 stores a maximum of 1024 entries within the range of addresses from 0x000 to 0x3FF.

The "header" field indicates header information composed of five elements, the communication protocol, the source IP address, the source port number, the destination IP address, and the destination port number. The communication protocol may include a transport layer protocol, such as TCP (Transmission Control Protocol) or UDP (User Datagram Protocol), and may include a version of a network layer protocol, such as IPv4 or IPv6.

The "action" field indicates the type of processing to be executed on packets that match the header field. Two or more actions may be performed on a single packet. The actions may include "FORWARD", which indicates the forwarding of a packet, "DROP", which indicates the discarding of a packet, and "NAT", which indicates the rewriting of the header of a packet. The "action data" field indicates arguments to be used when executing the actions. Depending on the action, action data may be present or absent. As one example, for a simple FORWARD that does not involve the rewriting of the header, action data may be omitted. For a NAT action, the source IP address and the source port number after rewriting may be specified.

For the flow table 161, the address indicating the storage position of each entry is calculated from the header field. As one example, a 32-bit string is calculated from the header field as a hash value according to CRC32. From the hash value, a string of least significant bits corresponding to the address length (for example, the lower 10 bits) is used as the address. When the size of the flow table 161 is sufficiently large, the probability of conflict between the storage positions of different entries (that is, the probability that the storage positions will be the same) is sufficiently low. On the other hand, the smaller the size of the flow table 161, the higher the probability of conflict.

Note that when determining the processing method for a packet by referring to the flow table 161, it is sufficient to read out the action and the action data. The position in the flow table 161 to be accessed is specified from the hash value of the received packet. This means that the header field does not need to be stored in the same table as the action and the action data and may instead be stored separately in a different table.

Figure 7:
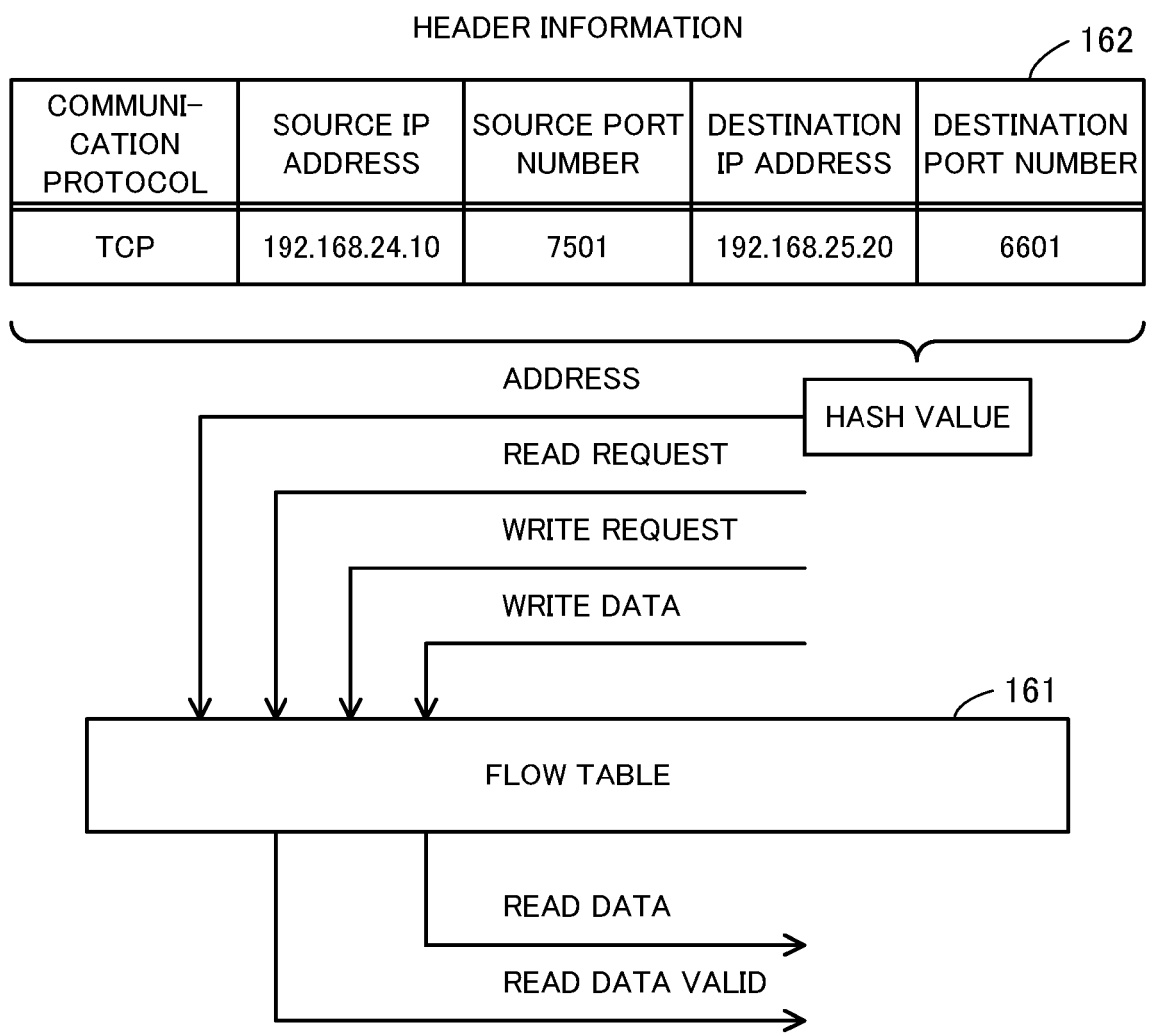
FIG. 7 depicts an example access to a flow table.

FIG. 7 depicts an example access to a flow table.

The FPGA 122 that accesses the flow table 161 has input signal lines named "ADDRESS", "READ REQUEST", "WRITE REQUEST", and "WRITE DATA" and output signal lines named "READ DATA" and "READ DATA VALID". "ADDRESS" indicates a position in the flow table 161. As described earlier, a hash value is calculated from the header information 162 indicating the five elements that are the communication protocol, the source IP address, the source port number, the destination IP address, and the destination port number. A bit string that forms part of the hash value is used as the value of ADDRESS.

"READ REQUEST" indicates whether there is a read request for an entry. READ REQUEST is set at ON (for example, 1) when there is a read request, and READ REQUEST is set at OFF (for example, 0) at other times. "WRITE REQUEST" indicates whether there is a write request for an entry. WRITE REQUEST is set at ON when a write request is made, and WRITE REQUEST is set at OFF at other times. "WRITE DATA" indicates an entry to be written into the flow table 161.

"READ DATA" indicates an entry read from the flow table 161. When READ REQUEST is ON, the entry at the position indicated by ADDRESS is read. The value of READ DATA includes actions and action data. "READ DATA VALID" indicates the success or failure of a read from the flow table 161. When an entry exists at the position indicated by ADDRESS (that is, when there is a "hit"), READ DATA VALID is set at ON, and when no entry exists at the position indicated by ADDRESS (that is, when there is a "miss"), READ DATA VALID is set at OFF. READ DATA VALID indicates whether the value of READ DATA is valid. Note that when WRITE REQUEST is ON, the value of WRITE DATA is written at the position indicated by ADDRESS.

Next, the abstraction of destination IP addresses will be described.

Figure 8:
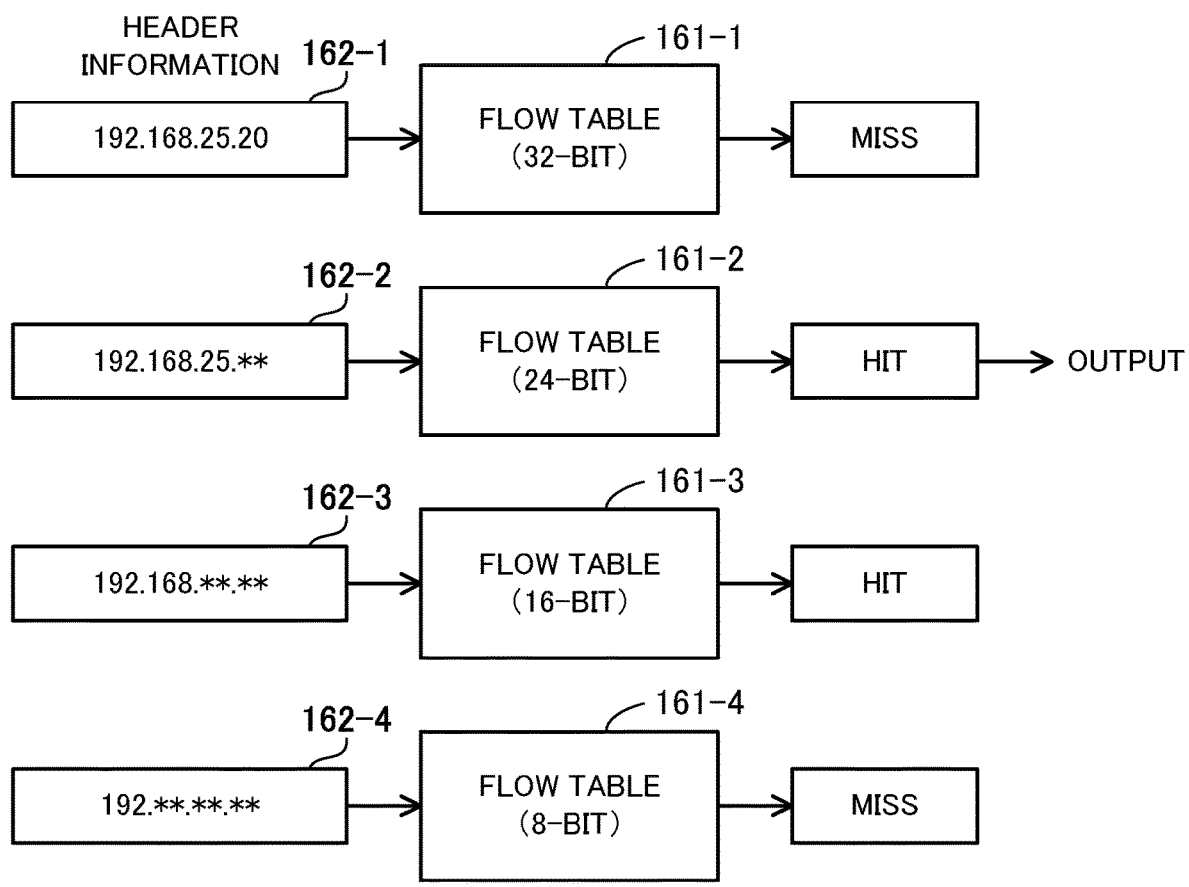
FIG. 8 depicts one example of longest prefix match.

FIG. 8 depicts one example of longest prefix match.

One transmitter (for example, one virtual machine) may transmit packets to many receivers (for example, many virtual machines). This means that when flow information is set for each individual pair of transmitter and receiver, the number of entries to be registered in the flow table 161 will be enormous. On the other hand, receivers with similar destination IP addresses often belong to physically the same network or adjacent networks. This means that in many cases, the action to be performed on packets with similar destination IP addresses will be the same.

For this reason, destination IP addresses are abstracted. When destination IP addresses are abstracted, the lower bits of a destination IP address included in the flow information are masked. The higher bits of a destination IP address that remain unmasked are sometimes referred to as the "prefix", and the length of the higher bits that remain unmasked is sometimes referred to as the "prefix length". When abstraction is performed, the lower bits of the destination IP address that are masked are replaced with predetermined values. As one example, the masked portion of a 32-bit destination IP address is replaced in 8-bit units with "*".

By abstracting the destination IP addresses, a plurality of entries where only the lower bits of the destination IP address differ and the remaining information is the same are combined into a single entry. As one example, an entry whose destination IP address has been abstracted to 192.168.25.** is a hit for packets whose destination IP addresses belong to a range from 192.168.25.0 to 192.168.25.255. When searching a flow table including abstracted destination IP addresses, the lower bits of the destination IP address are masked and the hash value is calculated from the masked header information.

However, it is not always possible to apply the same action to all packets with destination IP addresses that belong to the range of addresses that have been abstracted. As one example, it may be desirable to apply a different action to packets whose destination IP address is 192.168.25.20 out of the packets whose destination IP addresses belong to the range from 192.168.25.0 to 192.168.25.255.

For this reason, registration of a plurality of entries with different prefix lengths in the flow table is permitted. When doing so, the principle of longest prefix match is used. When a received packet matches a plurality of entries with different prefix lengths, the entry with the longest prefix is preferentially used. As one example, when a packet matches both an entry with the destination IP address 192.168.25.20 and an entry with the destination IP address that has been abstracted to 192.168.25.**, the former of these entries is preferentially used.

When destination IP addresses are abstracted, four types of entry with respective prefix lengths of 32 bits, 24 bits, 16 bits, and 8 bits may be hits for the same packet. To speed up searches of entries with different prefix lengths, the FPGA 122 executes searches for four entries with different prefix lengths in parallel.

The FPGA 122 holds the flow tables 161-1, 161-2, 161-3, and 161-4. The flow table 161-1 stores entries with a prefix length of 32 bits. In the header field of each entry in the flow table 161-1, the destination IP address is not masked. The flow table 161-2 stores entries with a prefix length of 24 bits. In the header field of each entry in the flow table 161-2, the lower 8 bits of the destination IP address are masked.

The flow table 161-3 stores entries with a prefix length of 16 bits. In the header field of each entry in the flow table 161-3, the lower 16 bits of the destination IP address are masked. The flow table 161-4 stores entries with a prefix length of 8 bits. In the header field of each entry in the flow table 161-4, the lower 24 bits of the destination IP address are masked.

The FPGA 122 generates header information 162-1, 162-2, 162-3, and 162-4 from one packet that has been received. The header information 162-1 is the unmodified header information of the received packet. In the header information 162-2, the lower 8 bits of the destination IP address in the header information of the received packet are masked. In the header information 162-3, the lower 16 bits of the destination IP address in the header information of the received packet are masked. In the header information 162-4, the lower 24 bits of the destination IP address in the header information of the received packet are masked. The FPGA 122 may generate the header information 162-1, 162-2, 162-3, and 162-4 in parallel.

The FPGA 122 calculates a hash value from the header information 162-1 and accesses the flow table 161-1 using an address corresponding to the hash value. The FPGA 122 also calculates a hash value from the header information 162-2 and accesses the flow table 161-2 using an address corresponding to the hash value. The FPGA 122 also calculates a hash value from the header information 162-3 and accesses the flow table 161-3 using an address corresponding to the hash value. The FPGA 122 also calculates a hash value from the header information 162-4 and accesses the flow table 161-4 using an address corresponding to the hash value. Since the lower bits of the destination IP addresses differ, the hash values respectively calculated from the header information 162-1, 162-2, 162-3, 162-4 often differ. The FPGA 122 may access the different flow tables in parallel.

The FPGA 122 selects any one of the outputs of the flow tables 161-1, 161-2, 161-3, and 161-4 based on the principle of longest prefix match. When the search result for the flow table 161-1 is a hit, the FPGA 122 selects an entry in the flow table 161-1. When the search result for the flow table 161-1 is a miss and the search result for the flow table 161-2 is a hit, the FPGA 122 selects an entry in the flow table 161-2. When the search results for the flow tables 161-1 and 161-2 are misses and the search result for the flow table 161-3 is a hit, the FPGA 122 selects an entry in the flow table 161-3.

When the search results for the flow tables 161-1, 161-2, and 161-3 are misses and the search result for the flow table 161-4 is a hit, the FPGA 122 selects an entry in the flow table 161-4. When the search results for the flow tables 161-1, 161-2, 1613, and 161-4 are all misses, the FPGA 122 determines that a corresponding entry does not exist. In the example in FIG. 8, the search results for the flow tables 161-1 and 161-4 are misses and the search results for the flow tables 161-2 and 161-3 are hits. According to longest prefix match, the FPGA 122 selects the output of the flow table 161-2.

Here, there is the issue of which memories are to store the divided flow tables 161-1, 161-2, 161-3, and 161-4. The SRAM 123 inside the FPGA 122 has a high access speed from the logic block area 124 but a small storage capacity. This means that when the flow tables 161-1, 161-2, 161-3, and 161-4 are all stored in the SRAM 123, the sizes of the flow tables 161-1, 161-2, 161-3, and 161-4 are reduced. This results in a high probability of conflict between the storage positions of different entries.

On the other hand, although the DRAM 121 located outside the FPGA 122 has a large storage capacity, the access speed from the logic block area 124 is slower than the SRAM 123. This means that when the flow tables 161-1, 161-2, 161-3, and 161-4 are always stored in the DRAM 121, entry searches are slow, which lowers the throughput.

For this reason, in the second embodiment, the FPGA 122 switches between using the DRAM 121 and the SRAM 123 according to the conflict state between entries. This switching between the DRAM 121 and the SRAM 123 is performed in units of divided flow tables. The FPGA 122 stores flow tables with low numbers of entries and no conflict between the storage positions of entries in the SRAM 123. On the other hand, the FPGA 122 moves a flow table where the number of entries has increased and a conflict has occurred between the storage positions of entries from the SRAM 123 to the DRAM 121. When this happens, the FPGA 122 expands the size of the flow table. When the conflict state has been resolved such as through the deletion of an entry, the FPGA 122 returns the flow table from the DRAM 121 to the SRAM 123.

Figure 9:
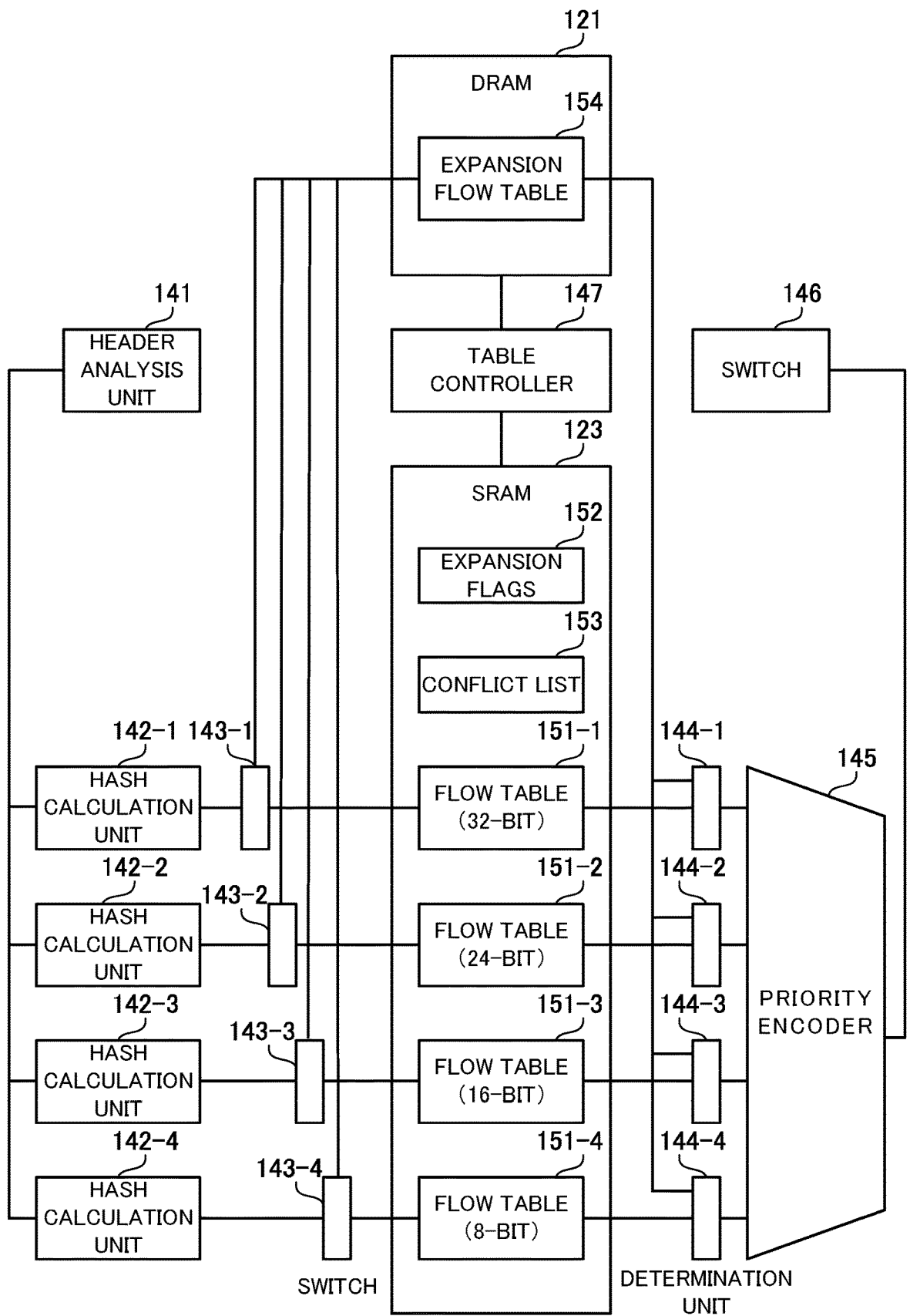
FIG. 9 is a block diagram depicting an example circuit configuration of an FPGA.

FIG. 9 is a block diagram depicting an example circuit configuration of an FPGA.

A header analysis unit 141, hash calculation units 142-1, 142-2, 142-3, and 142-4, switches 143-1, 143-2, 143-3, and 143-4, determination units 144-1, 144-2, 144-3, and 144-4, a priority encoder 145, a switch 146, and a table controller 147 are formed in the logic block area 124 of the FPGA 122. The SRAM 123 stores flow tables 151-1, 151-2, 151-3, and 151-4, expansion flags 152, and a conflict list 153. The DRAM 121 stores an expansion flow table 154. However, at least one of the expansion flags 152 and the conflict list 153 may be stored in the DRAM 121 or may be stored in the DRAM 102.

It is also possible to implement the functions of the table controller 147, which will be described later, by software executed by the CPU 101. Note that the SRAM 123 is one example of the memory 11 in the first embodiment. The DRAM 121 is one example of the memory 12 in the first embodiment. The table controller 147 is one example of the control unit 13 in the first embodiment.

The header analysis unit 141 receives an input of a packet and extracts the header information, including the communication protocol, the source IP address, the source port number, the destination IP address, and the destination port number, from the header of the received packet.

The hash calculation units 142-1, 142-2, 142-3, and 142-4 each calculate a hash value from the header information extracted by the header analysis unit 141. The hash calculation unit 142-1 corresponds to a prefix length of 32 bits. The hash calculation unit 142-1 calculates a 32-bit hash value from the header information according to CRC32. The hash calculation unit 142-2 corresponds to a prefix length of 24 bits. The hash calculation unit 142-1 masks the lower 8 bits of the destination IP address included in the header information and calculates a 32-bit hash value from the masked header information according to CRC32.

The hash calculation unit 142-3 corresponds to a prefix length of 16 bits. The hash calculation unit 142-3 masks the lower 16 bits of the destination IP address included in the header information and calculates a 32-bit hash value from the masked header information according to CRC32. The hash calculation unit 142-4 corresponds to a prefix length of 8 bits. The hash calculation unit 142-4 masks the lower 24 bits of the destination IP address included in the header information and calculates a 32-bit hash value from the masked header information according to CRC32.

The switches 143-1, 143-2, 143-3, and 143-4 each selectively access either the SRAM 123 or the DRAM 121 based on the inputted hash value. The access destination of the switches 143-1, 143-2, 143-3, and 143-4 is controlled by the table controller 147. The initial access destination is the SRAM 123.

The switch 143-1 corresponds to a prefix length of 32 bits. The switch 143-1 accesses the flow table 151-1 or the expansion flow table 154 using the lower bits of the hash value calculated by the hash calculation unit 142-1 as an address. As one example, addresses in the flow table 151-1 are the lower 10 bits of the hash value, and addresses in the expansion flow table 154 are the lower 20 bits of the hash value.

The switch 143-2 corresponds to a prefix length of 24 bits. The switch 143-2 accesses the flow table 151-2 or the expansion flow table 154 using the lower bits of the hash value calculated by the hash calculation unit 142-2 as an address. The switch 143-3 corresponds to a prefix length of 16 bits. The switch 143-3 accesses the flow table 151-3 or the expansion flow table 154 using the lower bits of the hash value calculated by the hash calculation unit 142-3 as an address. The switch 143-4 corresponds to a prefix length of 8 bits. The switch 143-4 accesses the flow table 151-4 or the expansion flow table 154 using the lower bits of the hash value calculated by the hash calculation unit 142-4 as an address.

The determination units 144-1, 144-2, 144-3, and 144-4 each select a valid output out of the output of the SRAM 123 and the output of the DRAM 121. The determination unit 144-1 corresponds to a prefix length of 32 bits. The determination unit 144-1 selects a valid output out of the output of the flow table 151-1 and the output of the expansion flow table 154.

The determination unit 144-2 corresponds to a prefix length of 24 bits. The determination unit 144-2 selects a valid output out of the output of the flow table 151-2 and the output of the expansion flow table 154. The determination unit 144-3 corresponds to a prefix length of 16 bits. The determination unit 144-3 selects a valid output out of the output of the flow table 151-3 and the output of the expansion flow table 154. The determination unit 144-4 corresponds to a prefix length of 8 bits. The determination unit 144-4 selects a valid output out of the output of the flow table 151-4 and the output of the expansion flow table 154.

The priority encoder 145 selects an output out of the outputs of the determination unit 144-1, 144-2, 144-3, and 144-4 based on the principle of longest prefix match. When there is one output where the search result is a hit, the priority encoder 145 selects that output. When there are two or more outputs where the search results are hits, the priority encoder 145 selects the output with the longest prefix length out of those two or more outputs. When there is no output where the search result is a hit, the priority encoder 145 selects a predetermined output (as examples, the output of the determination unit 144-1 or the output of the determination unit 144-4).

The switch 146 processes the packet based on the output of the priority encoder 145. As one example, when the retrieved action is DROP, the switch 146 discards the packet. When the retrieved action is FORWARD and the destination IP address is the IP address of a virtual machine running on the server apparatus 100, the switch 146 forwards the packet to the virtual machine in question. When the retrieved action is FORWARD and the destination IP address is not the IP address of a virtual machine running on the server apparatus 100, the switch 146 has the packet outputted from the communication interface 107. When the retrieved action includes a NAT, the switch 146 rewrites the header based on the action data.

Note that the switch 146 may learn and hold information indicating correspondence between destination IP addresses and the communication interface to output a packet. In addition, information indicating the communication interface to output a packet may be included in the entries of the flow table 151-1, 151-2, 151-3, 151-4 and/or the expansion flow table 154.

The flow table 151-1 corresponds to a prefix length of 32 bits. The flow table 151-1 holds entries in which the destination IP address is not masked. The flow table 151-2 corresponds to a prefix length of 24 bits. The flow table 151-2 holds entries in which the lower 8 bits of the destination IP address are masked. The flow table 151-3 corresponds to a prefix length of 16 bits. The flow table 151-3 holds entries in which the lower 16 bits of the destination IP address are masked. The flow table 151-4 corresponds to a prefix length of 8 bits. The flow table 151-4 holds entries in which the lower 24 bits of the destination IP address are masked.

The expansion flags 152 are flags indicating whether the entries have been moved from the SRAM 123 to the DRAM 121 (that is, whether expansion has been performed). The expansion flags 152 are individually assigned to the flow tables 151-1, 151-2, 151-3, and 151-4. As one example, when the expansion flag 152 corresponding to the flow table 151-1 is OFF (as one example, is set at 0), entries with a prefix length of 32 bits are stored in the flow table 151-1. On the other hand, when the expansion flag 152 corresponding to the flow table 151-1 is ON (as one example, set at 1), entries with a prefix length of 32 bits are stored in the expansion flow table 154. The initial value of the expansion flags 152 is OFF. The expansion flags 152 are rewritten by the table controller 147.

A pair of entries with conflicting storage positions are recorded in the conflict list 153. The conflict list 153 is created for each flow table where the expansion flag 152 is ON, out of the flow tables 151-1, 151-2, 151-3, and 151-4. The conflict list 153 is created, updated, and deleted by the table controller 147.

The expansion flow table 154 is a flow table with a larger size than the flow tables 151-1, 151-2, 151-3, and 151-4. As one example, the address length of the flow tables 151-1, 151-2, 151-3, and 151-4 is 10 bits and the address length of the expansion flow table is 20 bits. This means that in most cases, it will be possible to register entries with storage positions that conflict in the flow tables 151-1, 151-2, 151-3, and 151-4 in the expansion flow table 154 without conflict in the expansion flow table 154. As one example, an expansion flow table 154 is separately generated for each flow table whose expansion flag is ON, out of the flow tables 151-1, 151-2, 151-3, and 151-4. However, the expansion flow table 154 may be a flow table that is common to the four prefix lengths.

The table controller 147 controls the movement of entries between the SRAM 123 and the DRAM 121. The table controller 147 monitors the updating of the flow tables 151-1, 151-2, 151-3, and 151-4 and detects flow tables where conflict has occurred between entries. The table controller 147 moves all of the entries included in a flow table where a conflict has occurred to the expansion flow table 154. The table controller 147 then switches the access destination of the switch corresponding to the flow table where the conflict occurred, out of the switches 143-1, 143-2, 143-3, and 143-4, to the DRAM 121.

The table controller 147 then monitors the updating of the expansion flow table 154 and refers to the conflict list 153 to detect a flow table for which conflict between entries has been resolved. The table controller 147 returns all the entries to be registered in a flow table where the conflict has been resolved from the expansion flow table 154 to the flow table in question. The table controller 147 also checks pairs of entries recorded in the conflict list 153 and determines whether each pair are able to be combined through abstraction of the destination IP address. When combining is possible, the table controller 147 resolves the conflict state by combining the entries.

FIG. 10 depicts one example of a conflict list.

The conflict list 153 stores information on entries whose addresses conflict in one flow table (for example, the flow table 151-1). The conflict list 153 includes an ID that identifies the pair. The conflict list 153 also includes a header field and a hash value for each conflicting entry. The header field includes the communication protocol, the source IP address, the source port number, the destination IP address, and the destination port number. The hash value is calculated from the header field.

In the example of FIG. 10, the two entries whose ID=0 both have a hash value whose lower 16 bits are 0x3210. Accordingly, there is conflict between the storage positions of these two entries in the flow table 151-1. Likewise, the two entries whose ID=1 both have a hash value whose lower 16 bits are 0xabcd. Accordingly, there is conflict between the storage positions of these two entries in the flow table 151-1.

Next, the processing procedure of the server apparatus 100 will be described.

Figure 11:
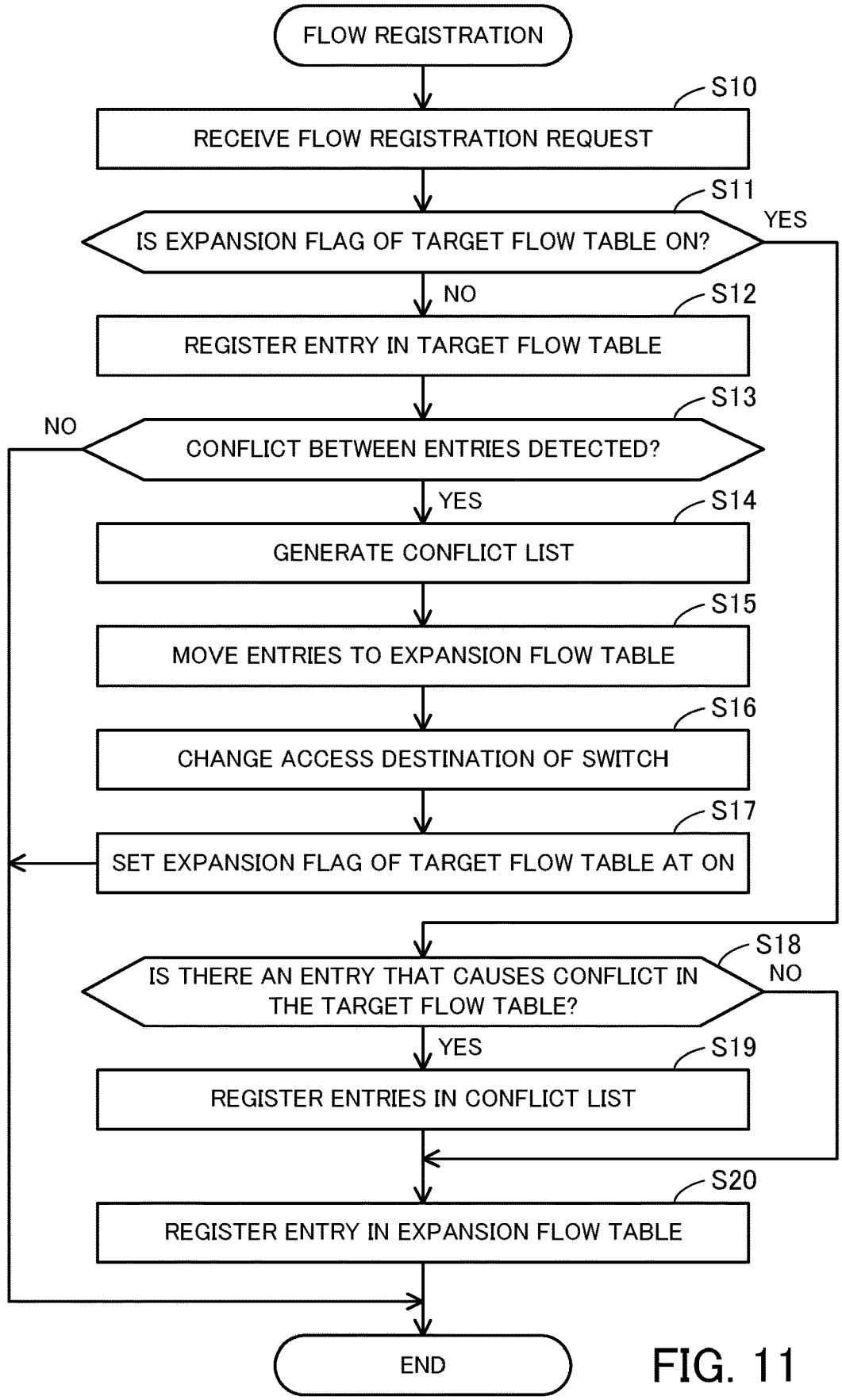
FIG. 11 is a flowchart depicting an example procedure for registering a flow.

FIG. 11 is a flowchart depicting an example procedure for registering a flow.

(S10) The table controller 147 receives a flow registration request. The flow registration request is issued by the control plane 136, for example, and is received via a part of the data plane 137 where software is implemented.

(S11) The table controller 147 checks a target flow table, in which an entry is to be registered, and determines whether the expansion flag corresponding to the target flow table is ON. The target flow table is determined according to the prefix length of the destination IP address. When the expansion flag is ON, the processing advances to step S18, and when the expansion flag is OFF, the processing proceeds to step S12.

(S12) The table controller 147 attempts to register the entry included in the flow registration request in the target flow table. As one example, the table controller 147 calculates a hash value from the header field of the entry to specify the storage position.

(S13) The table controller 147 determines whether conflict between the storage positions of entries was detected in the target flow table in step S12. When conflict was detected, the processing proceeds to step S14, and when no conflict was detected, the registration of a flow ends.

(S14) The table controller 147 generates a conflict list corresponding to the target flow table. Information on the entry included in the flow registration request and information of an existing entry that conflicts with the included entry are recorded in association with each other in the generated conflict list. The information on each entry includes the header field and a hash value.

(S15) The table controller 147 moves all existing entries from the target flow table to the expansion flow table. The table controller 147 also registers the entry included in the flow registration request in the expansion flow table. At this time, as one example, the table controller 147 calculates individual hash values for the entries included in the target flow table to specify the respective storage positions in the expansion flow table.

(S16) The table controller 147 switches the access destination of the switch corresponding to the target flow table, out of the switches 143-1, 143-2, 143-3, and 143-4, from the target flow table to the expansion flow table.

(S17) The table controller 147 updates the expansion flag corresponding to the target flow table from OFF to ON. The flow registration then ends.

(S18) The table controller 147 determines whether a conflict will occur when existing entries registered in the expansion flow table and the entry included in the flow registration request are stored in the target flow table. As one example, the table controller 147 determines whether the lower bits of the addresses of the existing entries registered in the expansion flow table. (for example, the lower 10 bits) and the lower bits of the hash value of the entry included in the flow registration request (for example, the lower 10 bits) are the same. When a conflict occurs, the processing proceeds to step S19, and when no conflict occurs, the processing proceeds to step S20.

(S19) The table controller 147 records a pair of conflicting entries in the conflict list corresponding to the target flow table.

(S20) The table controller 147 registers the entry included in the flow registration request in the expansion flow table.

Figure 12:
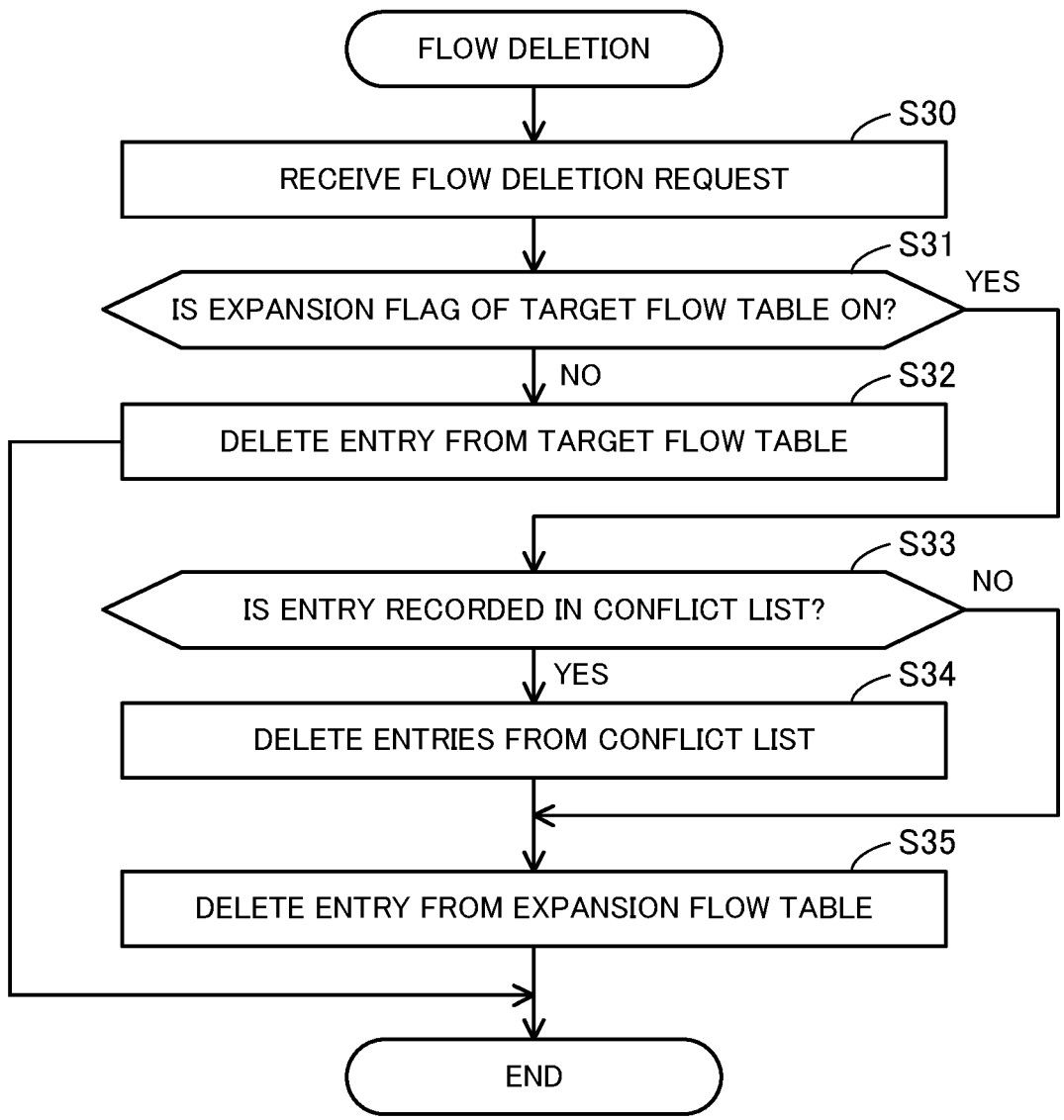
FIG. 12 is a flowchart depicting an example procedure for deleting a flow.

FIG. 12 is a flowchart depicting an example procedure for deleting a flow.

(S30) The table controller 147 receives a flow deletion request. The flow deletion request may be issued by the control plane 136 and received through the part of the data plane 137 where software is implemented. A flow deletion request may also occur due to the elapsing of a timeout period specified for the entry.

(S31) The table controller 147 checks a target flow table where an entry is to be deleted, and determines whether the expansion flag corresponding to the target flow table is ON. The target flow table is determined according to the prefix length of the destination IP address. When the expansion flag is ON, the processing proceeds to step S33, and when the expansion flag is OFF, the processing proceeds to step S32.

(S32) The table controller 147 deletes the entry specified by the flow deletion request from the target flow table. The flow deletion procedure then ends.

(S33) The table controller 147 determines whether the entry specified by the flow deletion request has been recorded in a conflict list corresponding to the target flow table. When the entry has been recorded in a conflict list, the processing proceeds to step S34, while when the entry has not been recorded, the processing proceeds to step S35.

(S34) The table controller 147 deletes the entry pair including the entry specified by the flow deletion request from the conflict list.

(S35) The table controller 147 deletes the entry specified by the flow deletion request from the expansion flow table.

Figure 13:
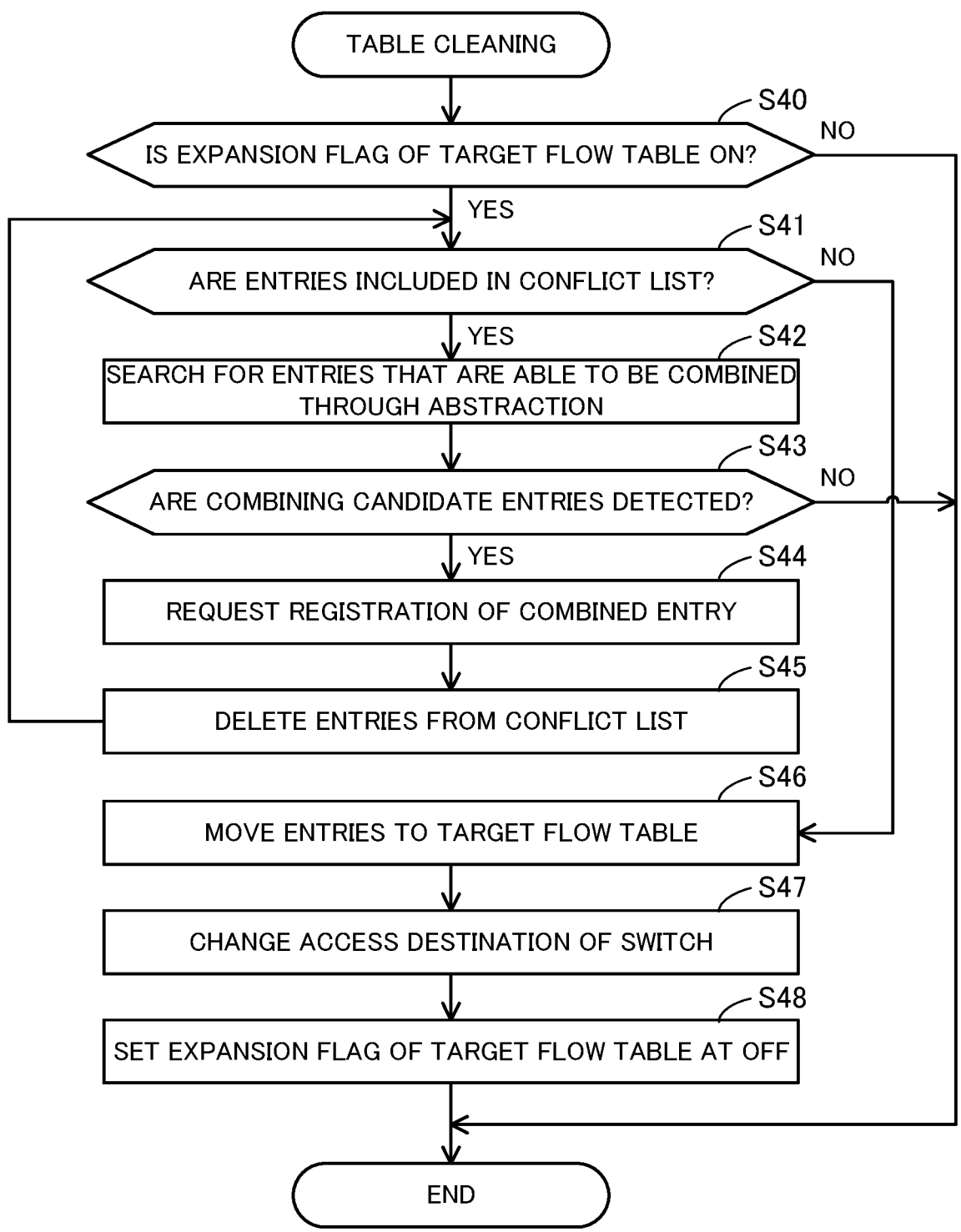
FIG. 13 is a flowchart depicting an example procedure for table cleaning.

FIG. 13 is a flowchart depicting an example procedure for table cleaning.

Table cleaning may be executed on a regular basis. Table cleaning may be executed after the flow deletion described above, or may be executed when a conflict list is updated.

(S40) The table controller 147 selects one of the flow tables 151-1, 151-2, 151-3, and 151-4 as the target flow table. The table controller 147 may execute steps S40 to S48 for each flow table, or may execute steps S40 to S48 only for flow tables that have been updated. The table controller 147 determines whether the expansion flag corresponding to the target flow table is ON. When the expansion flag is ON, the processing proceeds to step S41, and when the expansion flag is OFF, table cleaning of the target flow table ends.

(S41) The table controller 147 determines whether any entries are recorded in the conflict list corresponding to the target flow table. When entries are recorded in the conflict list, the processing proceeds to step S42, and when the conflict list is empty, the processing proceeds to step S46.

(S42) The table controller 147 searches the conflict list for combining candidate entries that are able to be combined by abstracting the destination IP addresses. The combining candidate entries referred to here are two or more entries where the only difference is in the lower bits of the destination IP address and the other information is the same, so that the respective contents of the entries will end up the same when the prefix length of the destination IP addresses are shortened.

(S43) The table controller 147 determines whether any combining candidate entries are detected in step S42. When combining candidate entries exist, the processing proceeds to step S44, and when there are no combining candidate entries, table cleaning of the target flow table ends.

(S44) The table controller 147 generates a combined entry, where the prefix length of the destination IP address is shortened, from the two or more combining candidate entries. The table controller 147 then requests registration of the combined entry. In response, the flow registration depicted in FIG. 11 is executed for the post-combining entry. The table controller 147 also deletes the two or more combining candidate entries from the expansion flow table.

(S45) The table controller 147 deletes entry pairs for two or more combining candidate entries from the conflict list. The processing then returns to step S41.

(S46) The table controller 147 moves all existing entries from the expansion flow table to the target flow table. At this time, as one example, the table controller 147 specifies the storage positions in the target flow table based on the lower bits of the addresses of the respective entries included in the expansion flow table.

(S47) The table controller 147 switches the access destination of the switch corresponding to the target flow table out of the switches 143-1, 143-2, 143-3, and 143-4 from the expansion flow table to the target flow table.

(S48) The table controller 147 updates the expansion flag corresponding to the target flow table from ON to OFF.

Figure 14:
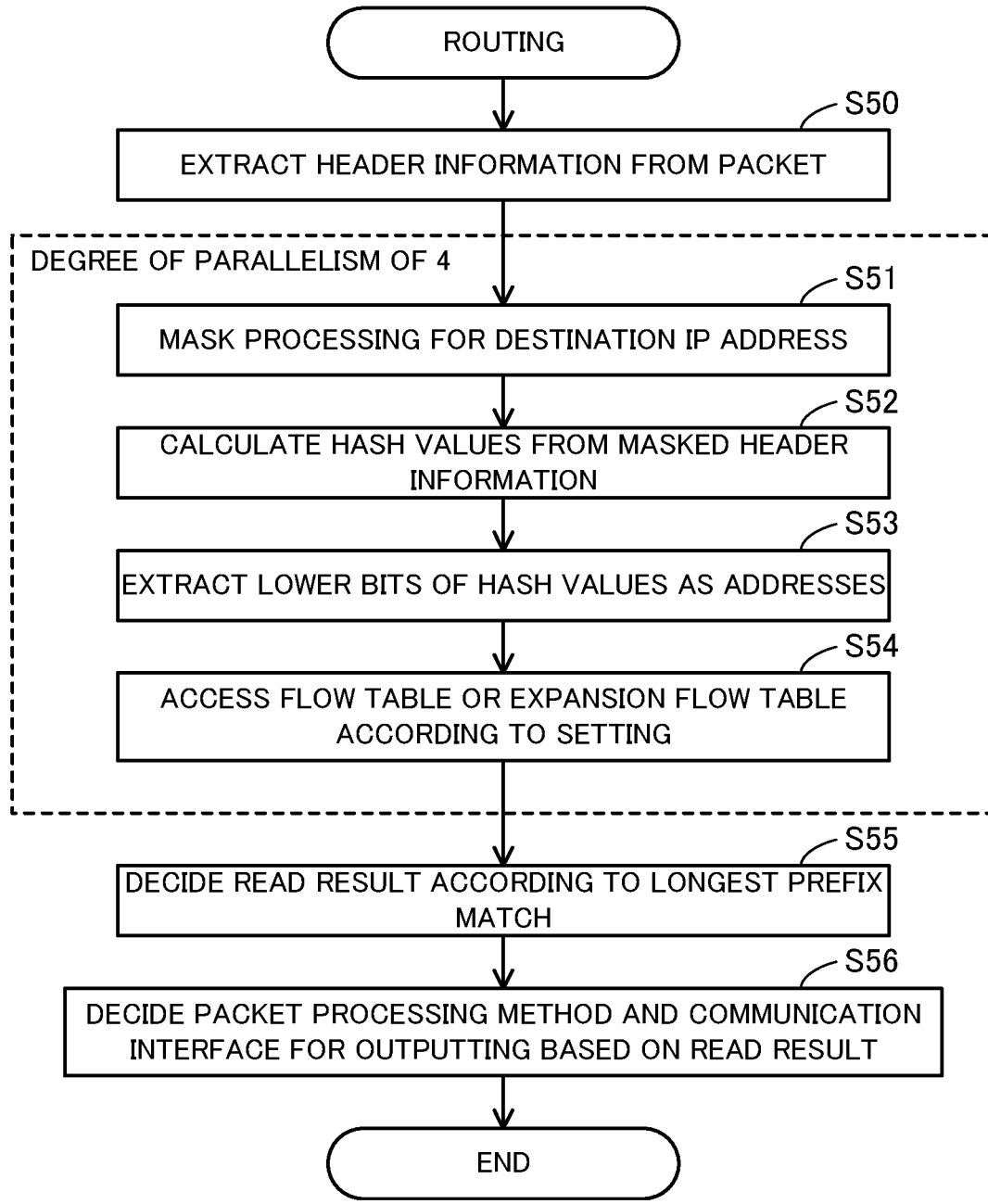
FIG. 14 is a flowchart depicting an example procedure for routing.

FIG. 14 is a flowchart depicting an example procedure for routing.

(S50) The header analysis unit 141 extracts the header information including the communication protocol, the source IP address, the source port number, the destination IP address, and the destination port number from a packet inputted into the FPGA 122. The steps S51 to S54 described below are executed in parallel with a degree of parallelism of 4 for the four prefix lengths.

(S51) The hash calculation units 142-2, 142-3, and 142-4 execute mask processing to replace the lower bits of the destination IP address included in the header information with a predetermined value.

(S52) The hash calculation units 142-1, 142-2, 142-3, and 142-4 each calculate a hash value according to CRC32 from the header information after masking.

(S53) The switches 143-1, 143-2, 143-3, and 143-4 each extract the lower bits of a hash value calculated in step S52 as an address. The address length differs according to whether the access destination is a flow table or the expansion flow table.

(S54) The switches 143-1, 143-2, 143-3, and 143-4 each attempt to read an entry from the flow table or the expansion flow table using an address calculated in step S53 according to a setting made by the table controller 147. The determination units 144-1, 144-2, 144-3, and 144-4 each acquire a read result outputted from a flow table or the expansion flow table.

(S55) The priority encoder 145 selects one of the four read results with four different prefix lengths according to longest prefix match to determine the final read result.

(S56) The switch 146 determines the packet processing method based on the read result determined in step S55. When a packet is to be forwarded, the switch 146 also determines the communication interface to output the packet.

Next, the throughput of the virtual router 135 will be described.

Figure 15:
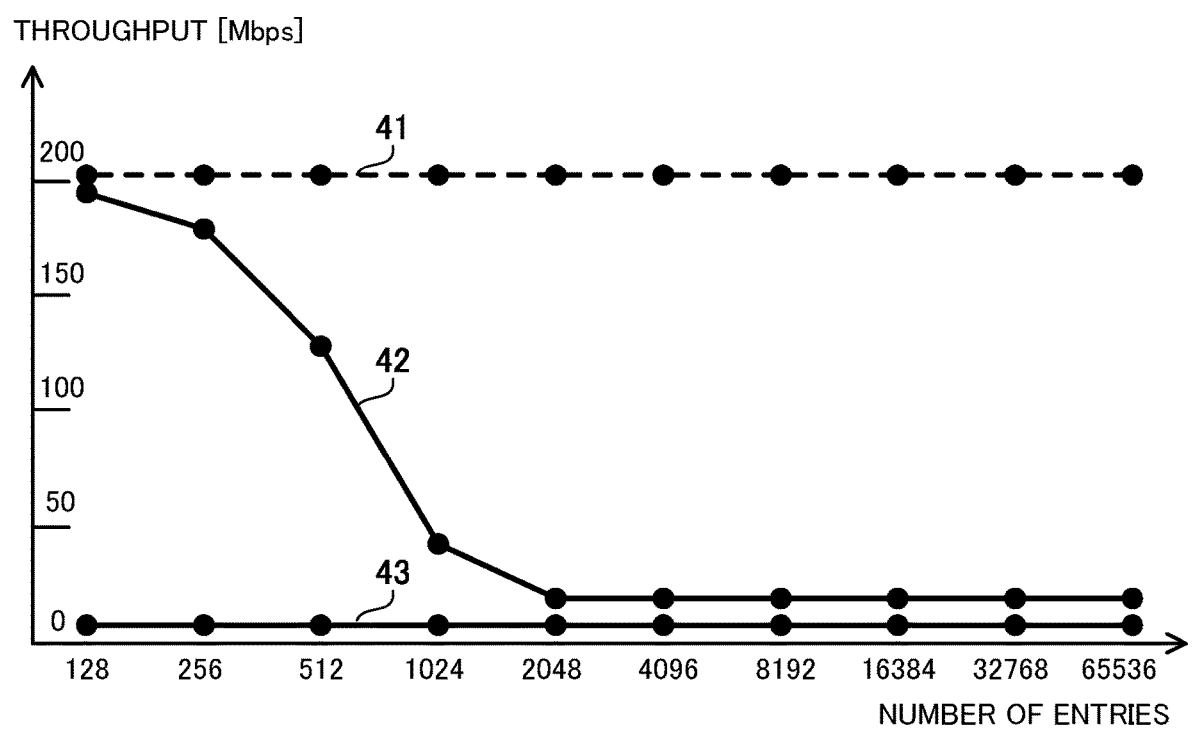
FIG. 15 is a graph depicting example throughputs of routing.

FIG. 15 is a graph depicting example throughputs of routing.

In the described example, the following hardware conditions are assumed. The storage capacity of the register 125 is 16 kilobytes (16 kB), the storage capacity of the SRAM 123 is 4 megabytes (4 MB), and the storage capacity of the DRAM 121 is 1 gigabyte (1 GB). The transfer speed of the memory interface between the FPGA 122 and the DRAM 121 is 96 gigabits per second (96 Gbps), the granularity of memory access is 64 bytes, and the effective performance of random access is 10%. The data length of an entry is 32 bytes, the maximum number of entries in a flow table is $2^{10}=1,024$, and the maximum number of entries in the expansion flow table is $2^{20}=1,048,576$.

The horizontal axis for the curves 41, 42, and 43 is the number of entries, that is, the number of registered flows. The vertical axis for the curves 41, 42, 43 is throughput, that is, the number of packets that are processable per second. The curve 41 indicates the throughput when only the SRAM 123 is used and the DRAM 121 is not used. However, the curve 41 indicates an idealized throughput where the limitation on the storage capacity of the SRAM 123 is ignored, which makes this throughput difficult to achieve in reality.

The curve 42 indicates the throughput when the SRAM 123 and the DRAM 121 are both used as described in the second embodiment. The curve 43 indicates the throughput when only the DRAM 121 is used and the SRAM 123 is not used. As indicated by the curve 43, the throughput is low when only the DRAM 121 is used. On the other hand, as indicated by the curve 42, when the SRAM 123 and the DRAM 121 are both used, while the number of entries is small, the throughput improves due to the influence of the SRAM 123 that has a high access speed.

Figure 16:
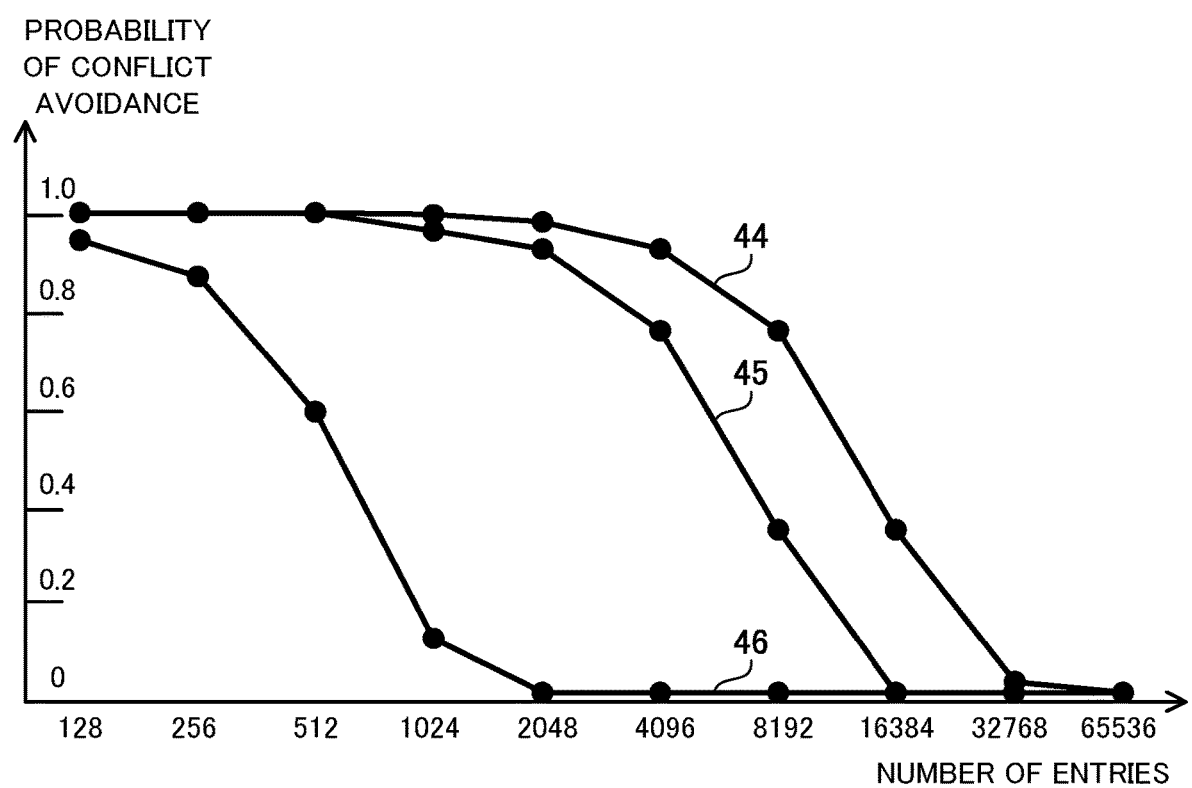
FIG. 16 is a graph depicting example probabilities of avoidance of conflict between entries.

FIG. 16 is a graph depicting example probabilities of avoidance of conflict between entries.

The horizontal axis for the curves 44, 45, and 46 is the number of entries, that is, the number of registered flows. The vertical axis for the curves 44, 45, and 46 is the probability of avoidance of conflict, that is, the probability of conflict not occurring between storage positions of different entries. The curve 44 indicates the probability of avoidance of conflict when the SRAM 123 and the DRAM 121 are both used as described in the second embodiment. The curve 45 indicates the probability of avoidance of conflict when only the DRAM 121 is used and the SRAM 123 is unused. The curve 46 indicates the probability of avoidance of conflict when only the SRAM 123 is used and the DRAM 121 is unused.

As indicated by curve 46, when only the SRAM 123 is used, conflicts between entries in a flow table soon occur as the number of entries increases. On the other hand, as depicted by the curve 44, when the SRAM 123 and the DRAM 121 are both used, the probability of avoidance of conflict is kept at a reasonably low level even as the number of entries increases. As described above, the table control performed in the second embodiment takes advantage of the high speed of the SRAM 123 and the large capacity of the DRAM 121 to balance throughput and the probability of conflicts being avoided. Note that although the SRAM 123 is given as an example of a high-speed, small-capacity memory and the DRAM 121 is given as an example of a low-speed, large-capacity memory in the second embodiment, the combination of two types of memory is not limited to this.

According to the information processing system of the second embodiment, a network is virtualized using a virtual router. This streamlines control of communication by virtual machines provided at server apparatuses. SDN is used for the virtual routers, so that the control plane that controls flows and the data plane that processes packets are separated. This enables flows to be flexibly set in accordance with the starting and stopping of virtual machines, and streamlines the control of the communication by virtual machines. Also, at least part of the processing on the data plane is performed by an FPGA. This reduces the load on the CPU and the system memory and reduces the influence on the processing by virtual machines.

While the number of entries is small, the flow table stored in the SRAM inside the FPGA is used, and when the number of entries has increased and conflict has occurred between addresses, the expansion flow table stored in the onboard memory outside the FPGA is used. Also, when a conflict has been resolved by updating the expansion flow table, the flow table stored in the SRAM inside the FPGA is used once again. As a result, the throughput of packet processing is improved.

By abstracting the destination IP addresses for registered entries, it is highly probable that the conflicts between entries will be resolved. Throughput is also improved by executing searches in parallel for entries whose destination IP addresses have different prefix lengths. By performing table control independently for a plurality of flow tables with different prefix lengths, it is possible to make the greatest possible use of the high-speed SRAM.

According to the present embodiments, it is possible to increase throughput of packet routing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a first memory storing a first table in which entries, which indicate forwarding methods for packets, are stored at positions corresponding to hash values calculated from header information of the packets;
a second memory storing a second table that is larger than the first table; and
a control circuit which executes a process including:
detecting, upon updating the first table, a conflict state where there is conflict between storage positions of different entries in the first table;
generating a conflict list and moving the entries stored in the first table to the second table in response to the detecting of the conflict state, the conflict list indicating two or more entries whose storage positions conflict in the first table but do not conflict in the second table;
detecting resolution of the conflict state based on the conflict list and an updated content of the second table; and
moving the entries stored in the second table to the first table in response to the detecting of the resolution.

2. The information processing apparatus according to claim 1, further comprising a routing circuit that accesses one of the first table and the second table to determine the forwarding method of a packet that has been received,
wherein the control circuit further executes a process including:
switching an access destination of the routing circuit from the first table to the second table in response to the detecting of the conflict state; and
switching the access destination from the second table to the first table in response to the detecting of the resolution.

3. The information processing apparatus according to claim 1,
wherein the header information includes a destination address,
the first memory additionally stores another first table in which entries corresponding to other hash values calculated by masking part of the destination address are stored, and
the control circuit further executes a process of detecting a conflict state for the other first table and moving the entries in the other first table independently of the detecting of the conflict state for the first table and the moving of the entries in the first table.

4. The information processing apparatus according to claim 1,
wherein the header information includes a destination address, and
when combining of the different entries by masking a part of the destination address is possible, the control circuit further executes a process of resolving the conflict state by combining the different entries.

5. The information processing apparatus according to claim 1, wherein each entry in the first table is identified using a bit string of a first bit length extracted from the hash value, and each entry in the second table is identified using a bit string of a second bit length, which is longer than the first bit length, extracted from the hash value.

6. The information processing apparatus according to claim 1,
further comprising a programmable device,
wherein the first memory and the control circuit are included in the programmable device, and the second memory is disposed outside the programmable device.

7. The information processing apparatus according to claim 1,
further comprising a processor that executes a virtual machine,
wherein one of the first table and the second table is selectively used for routing of packets transmitted or received by the virtual machine.

8. A packet control method comprising:
detecting, by a control circuit, a conflict state for a first table upon updating the first table stored in a first memory, the first table storing entries which indicate forwarding methods for packets at positions corresponding to hash values calculated from header information of the packets, the conflict state indicating conflict between storage positions of different entries in the first table;
generating, by the control circuit, a conflict list and moving the entries stored in the first table to a second table, which is stored in a second memory and is larger than the first table, in response to the detecting of the conflict state, the conflict list indicating two or more entries whose storage positions conflict in the first table but do not conflict in the second table;
detecting, by the control circuit, resolution of the conflict state based on the conflict list and an updated content of the second table; and
moving, by the control circuit, the entries stored in the second table to the first table in response to the detecting of the resolution.

\* \* \* \* \*